US010999465B2

(12) United States Patent
Packirisamy

(10) Patent No.: US 10,999,465 B2
(45) Date of Patent: May 4, 2021

(54) SYSTEMS AND METHODS FOR RETAINING DUPLEX SCANNING INFORMATION IN A SCANNED OUTPUT FILE

(71) Applicant: XEROX CORPORATION, Norwalk, CT (US)

(72) Inventor: Vinothraja Packirisamy, Thiruvarur (IN)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 16/186,668

(22) Filed: Nov. 12, 2018

(65) Prior Publication Data

US 2020/0153994 A1 May 14, 2020

(51) Int. Cl.
| | |
|---|---|
| *H04L 29/08* | (2006.01) |
| *G06Q 20/04* | (2012.01) |
| *G06F 3/12* | (2006.01) |
| *H04N 1/32* | (2006.01) |
| *H04N 1/203* | (2006.01) |
| *H04N 1/00* | (2006.01) |

(52) U.S. Cl.
CPC ..... *H04N 1/32133* (2013.01); *H04N 1/00244* (2013.01); *H04N 1/00474* (2013.01); *H04N 1/2032* (2013.01); *H04N 2201/0094* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,678,046 | A | * | 10/1997 | Cahill ............... | G06K 9/033 707/829 |
| 2002/0171876 | A1 | * | 11/2002 | Yoshida ............ | H04N 1/32117 358/400 |
| 2007/0146808 | A1 | * | 6/2007 | Kudo ................ | H04N 1/32112 358/448 |
| 2008/0068655 | A1 | * | 3/2008 | Kimura .............. | G06F 3/1285 358/1.16 |
| 2014/0240762 | A1 | * | 8/2014 | Shiraga ............. | G06F 3/1206 358/1.15 |
| 2015/0350470 | A1 | * | 12/2015 | Ha .................... | H04N 1/00503 358/1.13 |
| 2017/0270248 | A1 | * | 9/2017 | Kishimoto ......... | G06F 19/321 |
| 2018/0234580 | A1 | * | 8/2018 | Tabata .............. | H04N 1/00803 |

* cited by examiner

*Primary Examiner* — Helen Zong
(74) *Attorney, Agent, or Firm* — Jones Robb, PLLC

(57) ABSTRACT

According to aspects illustrated herein, methods and systems for retaining duplex scanning information in a scanned output file, is disclosed. The method includes receiving a document for scanning, having multiple pages, wherein each page has a first side such as a front side and a second side such as a back side. Then, a check for selection of a duplex scanning feature by a user, is performed. Upon scanning, an image data representing an image of the document is generated. The image data and the duplex scanning feature selected by the user is processed to generate a scanned output file. The duplex scanning information is generated, while generating the scanned output file. The duplex scanning information is retained in the scanned output file, for later retrieval and use. The duplex scanning information helps identify the first side and the second side in the scanned output file.

26 Claims, 10 Drawing Sheets

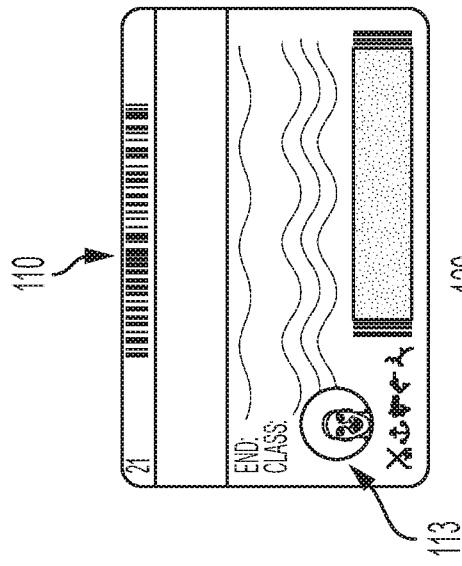
FIG. 1B
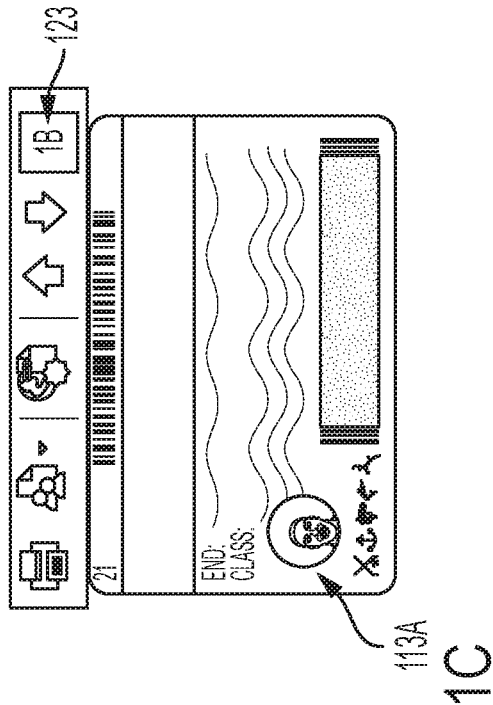
FIG. 1C
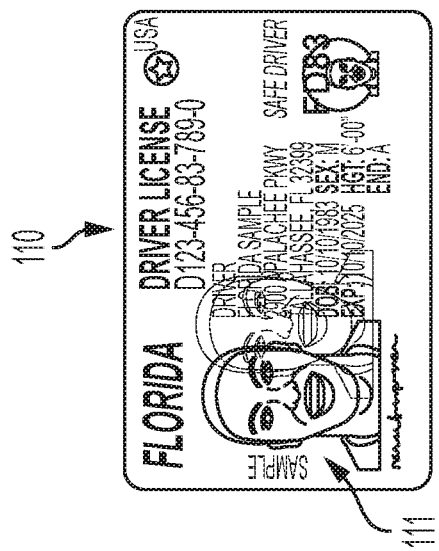
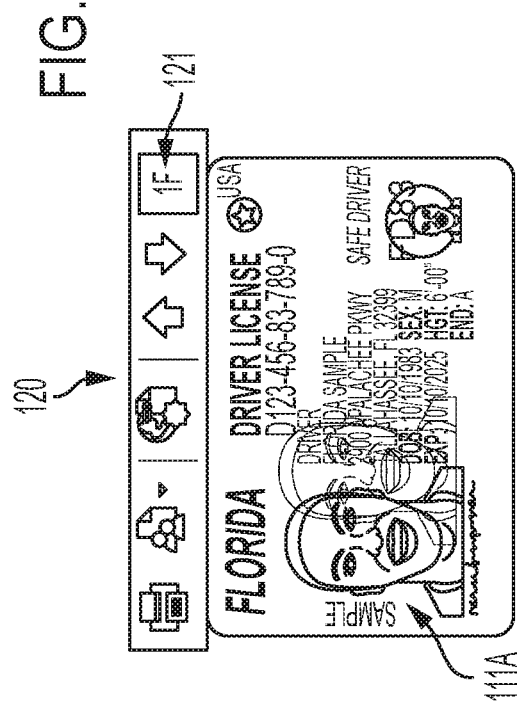

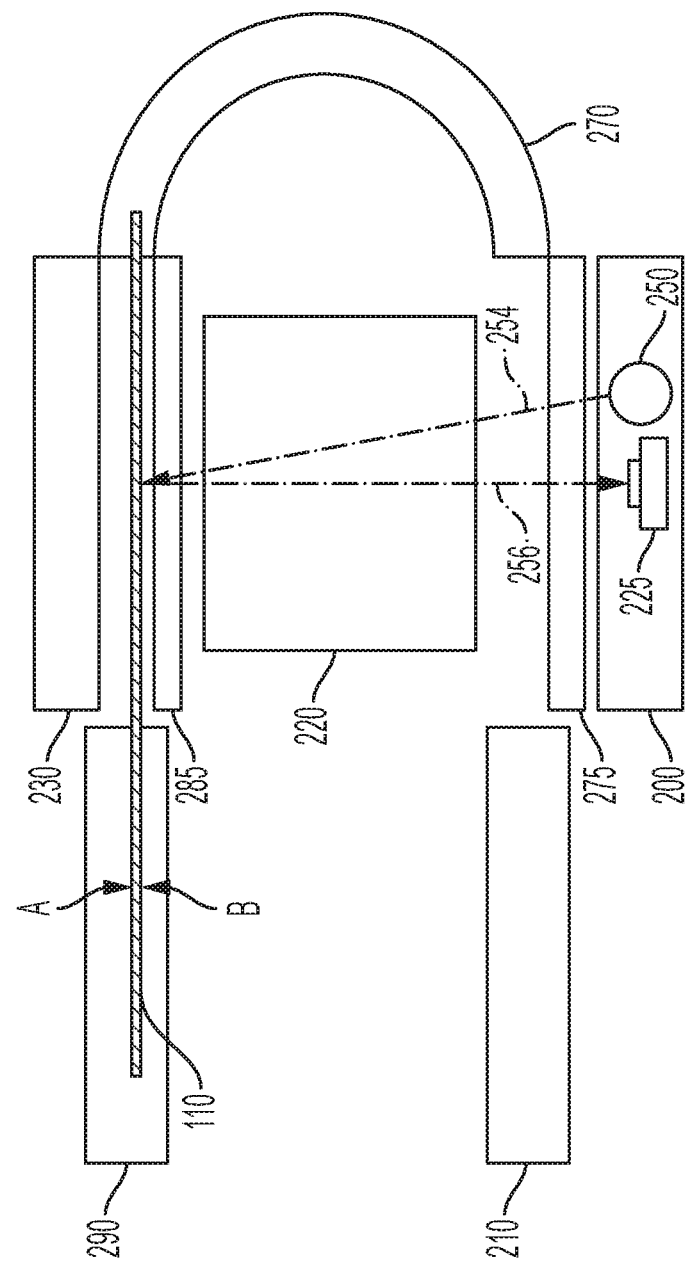

SYSTEMS AND METHODS FOR RETAINING DUPLEX SCANNING INFORMATION IN A SCANNED OUTPUT FILE

TECHNICAL FIELD

The present disclosure relates to the field of scanning and printing, more specifically, relates to methods and systems for retaining duplex scanning information in a scanned output file.

BACKGROUND

Scanning is important for digital age and is a day-to-day activity, where a user requires scanning a document such as a government identity proof, a passport, a form or other documents. The scanned document is sent to organizations such as banks, companies, government offices, etc., for records and various purpose. The document input for scanning may have multi-pages or may have a single page where content is present on both sides (back to back) of the page. When the user scans such document, two different scanned pages are output as a scanned output. And there is no information about both sides scanning in the scanned output or the information is lost while scanning. In future, when the same scanned output is printed again, then the original source format is not known. For example, there are no mechanisms to know that the scanned output file is scanned back to back and it needs to be printed back to back subsequently. The existing scanning technologies do not retain sides information in any form. Therefore, there is a need for methods and systems to overcome the above mentioned challenges.

SUMMARY

A method for retaining duplex scanning information in a scanned output file is disclosed. The method includes receiving a document for scanning, having multiple pages, wherein each page has two different sides such as a front side and a back side. Then, it is checked for selection of a duplex scanning feature by a user. Upon scanning, an image data representing an image of the document is generated. The image data and the duplex scanning feature selected by the user is processed to generate a scanned output file. The duplex scanning information is generated while generating the scanned output file. The duplex scanning information is retained in the scanned output file, for later retrieval and use.

A method for retaining duplex scanning information in a scanned output file is disclosed. The method includes receiving a document for scanning having a first side and a second side. A user interface is provided to enable duplex scanning feature by a user. An image data representing an image of the document is generated. The image data and the duplex scanning feature as enabled by the user, is processed. A new page number for each scanned page is automatically generated, wherein the new page number represents the duplex scanning information. Finally, a scanned output file is generated such that the scanned output file includes the new page number, wherein the page number generated for each scanned page helps identify whether the scanned page represents the first side or the second side. The duplex scanning information helps identify the two different sides of the document in the scanned output file.

A method for retaining duplex scanning information in a scanned output file is disclosed. The method includes receiving a document for scanning having a first side and a second side for each page. A user interface is provided to enable duplex scanning feature by a user. An image data representing an image of the document is generated. The image data and the duplex scanning feature as enabled by the user, is processed. A scanned output file is generated having scanned pages. While generating the scanned output file, a new file extension is automatically assigned to the scanned output file, wherein the new file extension represents the duplex scanning information.

A multi-function device including a user interface, a scanner and a controller is disclosed. The user interface is to allow a user to select a duplex scanning feature by a user. The scanner having a scan data generator is to receive a document for scanning having a first side and a second side of a page; and generate an image data representing an image of the document. The controller having a scan file generator to process the image data and the duplex scanning feature selected by the user to generate a scanned output file; generate the duplex scanning information, while generating the scanned output file; and retain the duplex scanning information in the scanned output file, for later retrieval.

A system including a multi-function device and a server is disclosed. The multi-function device receives a document for scanning having multiple pages, wherein each page has two different sides; checks for selection of a duplex scanning feature by a user; and upon scanning, generates an image data representing an image of the document. The server processes the image data and the duplex scanning feature selected by the user to generate a scanned output file; generates the duplex scanning information, while generating the scanned output file; and retains the duplex scanning information in the scanned output file, for later retrieval.

A non-transitory computer-readable medium comprising instructions executable by a processing resource to receive a document for scanning having multiple pages, wherein each page has two different sides; check for selection of a duplex scanning feature by a user; upon scanning, generate an image data representing an image of the document; process the image data and the duplex scanning feature selected by the user to generate a scanned output file; generate the duplex scanning information, while generating the scanned output file; and retain the duplex scanning information in the scanned output file, for later retrieval.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 1B is a document input for scanning and FIG. 1C represents a scanned output file having duplex scanning information.

FIGS. 2A, 2B and 2C show exemplary duplex scanning system according to one implementation.

FIGS. 7A and 7B show exemplary snapshots indicating various scan options.

DESCRIPTION

Figure 1A:
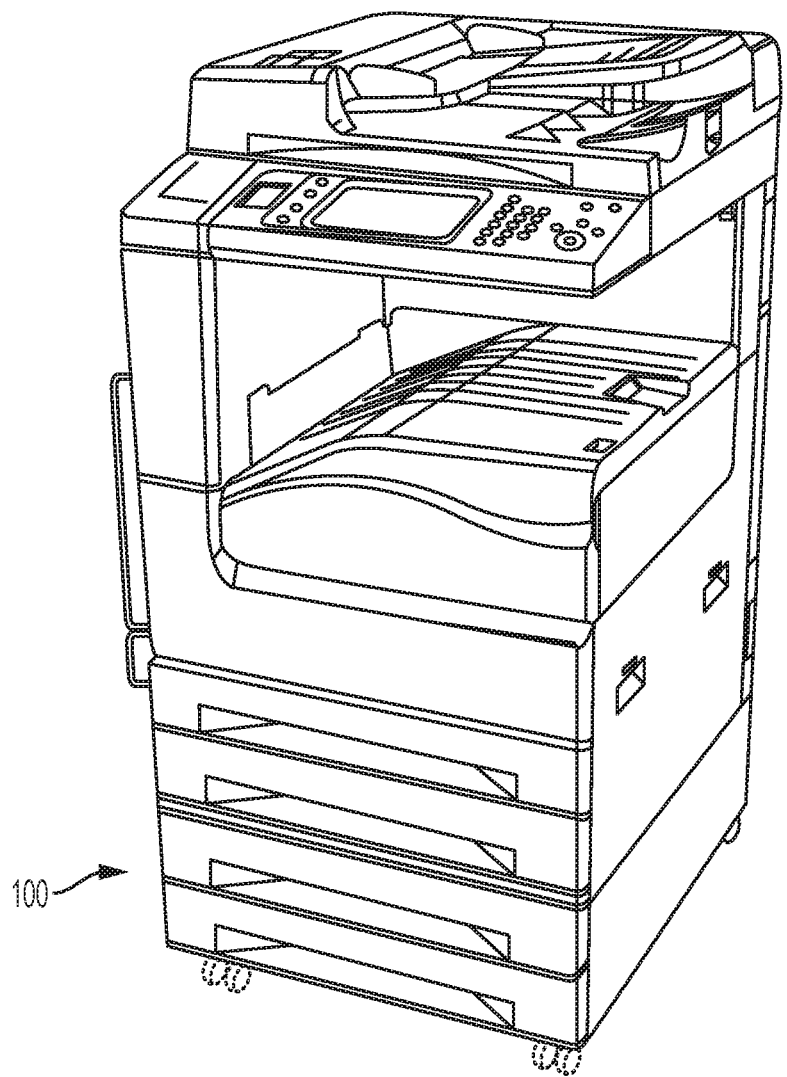
FIG. 1A is a real physical multi-function device.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity and are intended to include more examples than just provided below.

The term "multi-function device" refers to a device or a combination of multiple devices configured to perform one or more functions, but not limited to, scanning, printing, copying, faxing, imaging, and so forth. The multi-function device includes software, hardware, firmware, or a combination thereof. In context of the current disclosure, the multi-function device scans a document and generates a scanned output file corresponding to the document such that the scanned output file includes duplex scanning information for/in the scanned output file.

The term "document" refers to any document in physical form, such as printed on paper, submitted for scanning. The document is a multi-page document or includes at least one page having two different sides, a first side and a second side. For example, the first side may be a front side and the second side may be a back side. Various examples of the document include, but not limited to, visa applications, medical forms, bills, reports, government documents, identify proofs, bound books, books, etc. The document may interchangeably be used with the term "input document". The document may be referred to as "original."

The term "scanned output file" refers to a scanned output generated as a result of scanning operation. In context of the current disclosure, the scanned output file includes duplex scanning information. The scanned output file may interchangeably be used with the term "scanned document" or "scanned output."

The term "duplex scanning" refers to scanning both sides of a page. The term "duplex scanning" may interchangeably be used with the phrase "back to back" scanning. The term "duplex printing" refers to printing on both sides of a single sheet.

The term "duplex scanning information" includes any information that indicates the document is duplex scanned and/or further that helps identify the two different sides of the document in the scanned output file. For example, the duplex scanning information indicates which scanned page of the scanned output file represents a front side and which scanned page represents a back side. The duplex scanning information may interchangeably be used with the term "duplex scanning property".

Exemplary Embodiments

A method for retaining duplex scanning information in a scanned output file is disclosed. The method includes receiving a document for scanning, having multiple pages, wherein each page has two different sides such as a front side and a back side. Then, it is checked for selection of a duplex scanning feature by a user. Upon scanning, an image data representing an image of the document is generated. The image data and the duplex scanning feature selected by the user is processed to generate a scanned output file. The duplex scanning information is generated while generating the scanned output file. The duplex scanning information is retained in the scanned output file, for later retrieval and use. The duplex scanning information helps identify the two different sides of the document in the scanned output file.

The duplex scanning information is retained in the scanned output file in the form of a property. The duplex scanning information includes at least one of a new page number for each scanned page in the scanned output file and a new file extension for the scanned output file. The method includes storing the scanned output file having the duplex scanning information. The method includes assigning a new page number to each scanned page. The new page number is assigned with side designation. The method includes automatically displaying the new page number for each scanned page in the page property, when the user opens the scanned output file. The method includes assigning a new file extension to the scanned output file. The method includes receiving the scanned output file with duplex scanning information, by a multi-function device, for printing. The method includes automatically enabling duplex printing, before printing the scanned output file.

A method for retaining duplex scanning information in a scanned output file is disclosed. The method includes receiving a document for scanning having a first side and a second side. A user interface is provided to enable duplex scanning feature by a user. An image data representing an image of the document is generated. The image data and the duplex scanning feature as enabled by the user, is processed to generate a scanned output file. A new page number for each scanned page is automatically generated, wherein the new page number represents the duplex scanning information. Finally, a scanned output file is generated such that the scanned output file includes the new page number for each scanned page, wherein page number generated for each scanned page helps identify whether the scanned page represents the first side or the second side.

The new page number for each scanned page includes information about side of the document. The method includes automatically displaying the new page number for each scanned page in the corresponding page property of the scanned output file, when the user opens the scanned output file. The method includes receiving the scanned output file with the new page number for each scanned page, for printing. The method includes analyzing the scanned output file to identify the new page number for each scanned page in the scanned output file. The method includes automatically enabling duplex printing, before printing the scanned output file.

A method for retaining duplex scanning information in a scanned output file is disclosed. The method includes receiving a document for scanning having a first side and a second side for each page. A user interface is provided to enable duplex scanning feature by a user. An image data representing an image of the document is generated. The image data and the duplex scanning feature as enabled by the user, is processed. A scanned output file having scanned pages is generated. While generating the scanned output file, a new file extension is automatically assigned to the scanned output file, wherein the new file extension represents the duplex scanning information.

The method includes storing the scanned output file with the new file extension. The method includes automatically enabling duplex print setting when the scanned output file with the new file extension, is received for printing.

A multi-function device including a user interface and a scanner is disclosed. The user interface is to allow a user to select a duplex scanning feature. The scanner having a scan data generator to receive a document for scanning having a first side and a second side of a page; generate an image data representing an image of the document. The controller having a scan file generator to process the image data and the duplex scanning feature selected by the user, to generate a scanned output file; generate the duplex scanning information, while generating the scanned output file; and retain the duplex scanning information in the scanned output file, for later retrieval.

The duplex scanning information is retained in the scanned output file in the form of a property. The duplex scanning information includes at least one of a new page number for each scanned page in the scanned output file and a new file extension for the scanned output file. The controller is to assign a new page number to each scanned page in the scanned output file. The new page number for each scanned page includes information about the side of the document. The multi-function device is communicatively coupled to a computing device, wherein the computing device is to automatically display the new page number for each scanned page in the page property of the scanned output file, when the user opens the scanned output file. The controller is to assign a new file extension to the scanned output file. The multi-function device is communicatively coupled to another multi-function device. The another multi-function device is to automatically enable duplex print setting when the scanned output file with the duplex scanning information, is received for printing.

A system including a multi-function device and a server is disclosed. The multi-function device receives a document for scanning having multiple pages, wherein each page has two different sides; checks for selection of a duplex scanning feature by a user; and upon scanning, generates an image data representing an image of the document. The server processes the image data and the duplex scanning feature selected by the user to generate a scanned output file; generates the duplex scanning information, while generating the scanned output file; and retains the duplex scanning information in the scanned output file, for later retrieval.

The duplex scanning information is retained in the scanned output file in the form of a property. The duplex scanning information includes at least one of a new page number for each scanned page in the scanned output file and a new file extension for the scanned output file. The server is to assign a new page number to each scanned page in the scanned output file. The new page number for each scanned page includes information about the side of the document. The multi-function device is communicatively coupled to a computing device, wherein the computing device is to automatically display the new page number for each scanned page in the page property of the scanned output file, when the user opens the scanned output file. The server is to assign a new file extension to the scanned output file. The multi-function device is communicatively coupled to another multi-function device. The another multi-function device is to automatically enable duplex print setting when the scanned output file with the duplex scanning information, is received for printing.

A non-transitory computer-readable medium comprising instructions executable by a processing resource to receive a document for scanning having multiple pages, wherein each page has two different sides; check for selection of a duplex scanning feature by a user; upon scanning, generate an image data representing an image of the document; process the image data and the duplex scanning feature selected by the user to generate a scanned output file; generate the duplex scanning information, while generating the scanned output file; and retain the duplex scanning information in the scanned output file, for later retrieval.

The duplex scanning information is retained in the scanned output file in the form of a property. The duplex scanning information includes at least one of a new page number for each scanned page in the scanned output file and a new file extension for the scanned output file. The non-transitory computer-readable medium includes instructions executable by the processing resource to store the scanned output file having the duplex scanning information. The non-transitory computer-readable medium includes instructions executable by the processing resource to assign a new page number to each scanned page. The new page number is assigned with side designation. The non-transitory computer-readable medium includes instructions executable by the processing resource to automatically display the new page number for each scanned page in the page property, when the user opens the scanned output file. The non-transitory computer-readable medium includes instructions executable by the processing resource to assign a new file extension to the scanned output file. The non-transitory computer-readable medium includes instructions executable by the processing resource to receive the scanned output file with duplex scanning information, by a multi-function device, for printing. The non-transitory computer-readable medium includes instructions executable by the processing resource to automatically enable duplex printing, before printing the scanned output file.

Overview

Generally, when a user wishes to scan both sides of a document/page (i.e., duplex scanning), scanned output is generated in the form of two different scanned pages. And when the user wishes to print the same scanned output, the user needs to manually set double side printing option while printing, else the scanned output is printed on two separate sheets. As the original source format is not known, hence two separate sheets are printed. The problem is that there is no information about duplex scanning or the information about duplex scanning is lost while processing. Therefore, there is a need for methods and systems that help retain duplex scanning information in the scanned output. In view of this, the present disclosure is submitted.

The present disclosure discloses methods and systems for retaining duplex scanning information in a scanned output file. The duplex scanning information may be in the form of a property. The duplex scanning information may be in the form of a new page number for each scanned page and/or in the form of a new file extension for the scanned output file. The new page number includes information about side of a document in any format. The duplex scanning information helps identify which scanned page represents a front side and which scanned page represents a back side. For example, the page number for each scanned page is designated with side information such as front side or back side, hence, it is easy to determine whether the scanned page represents the front side, or the back side based on the new page number. In another example, the new file extension automatically helps determine that the scanned output file is duplex scanned, and the scanned output file is processed accordingly. For example, at the time of printing, scanned pages are printed on both sides of a single sheet.

The duplex scanning information is useful when a user opens the scanned output file. For example, when the user opens the scanned output file, the new page numbers are displayed that help the user know which scanned page is a front page and which scanned page is a back page. The duplex scanning information is also useful when a user prints the same scanned output file, the duplex scanning information is maintained in printouts. For example, when the scanned output file with the duplex scanning information is sent for printing, a multi-function device automatically identifies that the scanned output file requires duplex printing. As a result, the multi-function device prints the scanned pages representing the front and back sides of a page on both sides of a single sheet instead of printing the front and back pages on two separate sheets. By retaining the duplex scanning information in the scanned output file, the original source format is known, and the scanned output file can be processed accordingly.

The present disclosure may be implemented by organizations such as banks, government offices, companies or any organizations where scanned output files with duplex scanning information can be useful. The scanned output file may be stored or may further be sent to any other branch for record purpose and/or for printing. This is just one example for understanding purposes, but the disclosure may be implemented by any organizations or by individual users. The disclosure may be implemented when there is a need to recreate originals. For example, the disclosure may be useful in document workflows and applications (e.g., legal) where original order correspondence is helpful.

Exemplary Environment and Examples

FIG. 1 is a real physical multi-function device 100. The multi-function device 100 typically includes the functionality of printing, scanning copying, faxing, imaging, or the like. The multi-function device 100 may be a single device incorporating all the functionalities as discussed or may be a combination of multiple devices such as a scanner, a printer, a copier, a fax machine, and so on. The multi-function device 100 may interchangeably be used with the term "a printer" or "a scanner."

A user (although not shown) uses the multi-function device 100 for his day-to-day activities such as printing a document, scanning a document, copying a document, imaging and so forth. In context of the current disclosure, the multi-function device 100 receives a document for scanning and generates a scanned output file such that the scanned output file includes duplex scanning information. The multi-function device 100 generates duplex scanning information and retains the duplex scanning information such that the duplex scanning information can be useful when viewing the scanned output file or can be useful while printing the scanned output file. The duplex scanning information is retained in the electronic version of the document, i.e., in the scanned output file. The duplex scanning information retained in the scanned output file is considered while printing the same scanned output file. While generating the scanned output file, a new mechanism of generating the duplex scanning information is incorporated and implemented. This will be discussed in detail below in conjunction with FIGS. 3-6.

The duplex scanning information may be in the form of a property. The property is readable and recognized by the multi-function device 100. The duplex scanning information may be embedded in the scanned output file. The duplex scanning information may be in the form of a new page number for each scanned page and/or in the form of a new file extension for the scanned output file. The new page number includes information about side of the document in any format. The new file extension represents a new format for the scanned output file. The new file extension of the scanned output file indicates that the scanned output file is duplex scanned, i.e., both sides of the document are scanned. The new file extension further indicates that scanned pages in the scanned output file are present such that a first scanned page represents a first side such as a front side and a second scanned page represents a second side such as a back side. Accordingly, while printing, the multi-function device 100 recognizes the new file extension and automatically change print settings to duplex printing where scanned pages present in the scanned output file are printed on both sides of a single sheet.

The document submitted or received for scanning may be any document. Various examples of the document may include, but not limited to, a government identity proof, a book, a medical form, a bank form, a visa application or the like. These are just few examples, there can be other many other examples of the document. The document includes one or more pages, where each page has a front side and a back side (collectively referred to as both sides). The document submitted for scanning may be of any size as known or later developed sizes. One such exemplary document 110 is shown in FIG. 1B. The document 110 is a driving license having a front side 111 and a back side 113.

In context of the present disclosure, the multi-function device 100 receives the document for scanning. Particularly, the multi-function device 100 receives the document for duplex scanning, i.e., when the user wishes to scan both sides of the document. The multi-function device 100 scans the document and generates a scanned output file. The scanned output file generated according to the implementation of the present disclosure includes a single scanned output file including duplex scanning information. The duplex scanning information may be represented by a new page number for each scanned page, where the new page number for each scanned page represents whether it is a front side or a back side. The duplex scanning information may be a new file extension for the scanned output file. The duplex scanning information can be viewed by a user when the user opens the scanned output file. The duplex scanning information can be read and recognized by the multi-function device 100.

For easy understanding, an example is discussed. It is considered that the document 110 or a single page is submitted for scanning, the document 110 has a front side 111 and a back side 113. The multi-function device 100 receives the document 110 for scanning and performs duplex scanning, where both sides 111 and 113 are scanned by the multi-function device 100. The multi-function device 100 generates a single scanned output file such as 120 having scanned pages as 111A (corresponding to the front side 111 of the page 110) and 113A (corresponding to back side 113 of the page 110). While generating the scanned output file 120, the multi-function device 100 generates duplex scanning information for the scanned output file 120 and retains the duplex scanning information in the scanned output file 120. As an example, if the duplex scanning information is a new page number for each scanned page 111A and 113A, then the new page numbers are displayed when the user opens the scanned output file 120. As shown in FIG. 1C, the scanned page 111A is represented by a page number 121 "1F" indicating the scanned page is 1 of the document 110 and "F" represents the front side of the page 1. Similarly, the scanned 113A is represented by a page number 123 "1B," where 1 indicates the scanned page 1 and "B" represents the back side of the page 1. The new page numbers are shown as a property of the scanned output file. In other example, the scanned output file 120 can have a new file extension such as "scannedoutput.b2b" and it can be viewable like other files such PDF, etc. Here, "scannedoutput" represents the name of the scanned output file and "*.b2b" represents the extension type.

The methods and systems retain the duplex scanning information such that the duplex scanning information can be useful when referring/viewing the scanned output file or can be useful when printing the scanned output file.

For easy understanding, a document with one page is shown but it is understood that the document may have multiple pages, each page with a front side and a back side. The way a single page of the document is processed, all other pages are processed in the same manner to retain the duplex scanning information. Further, the document shown above has sides in the form of a front side and a back side. The front side and back side of the document are considered just for illustration purpose, without limiting the scope of disclosure. It is understood that there can be other documents that may have sides in the form of a left side or a right side. Bound document is one such non-limiting example.

The duplex scanning information in the form of new pages numbers and/or new file extension is exemplary and other variations can be implemented.

Exemplary Duplex Scanning System

Figure 2A:
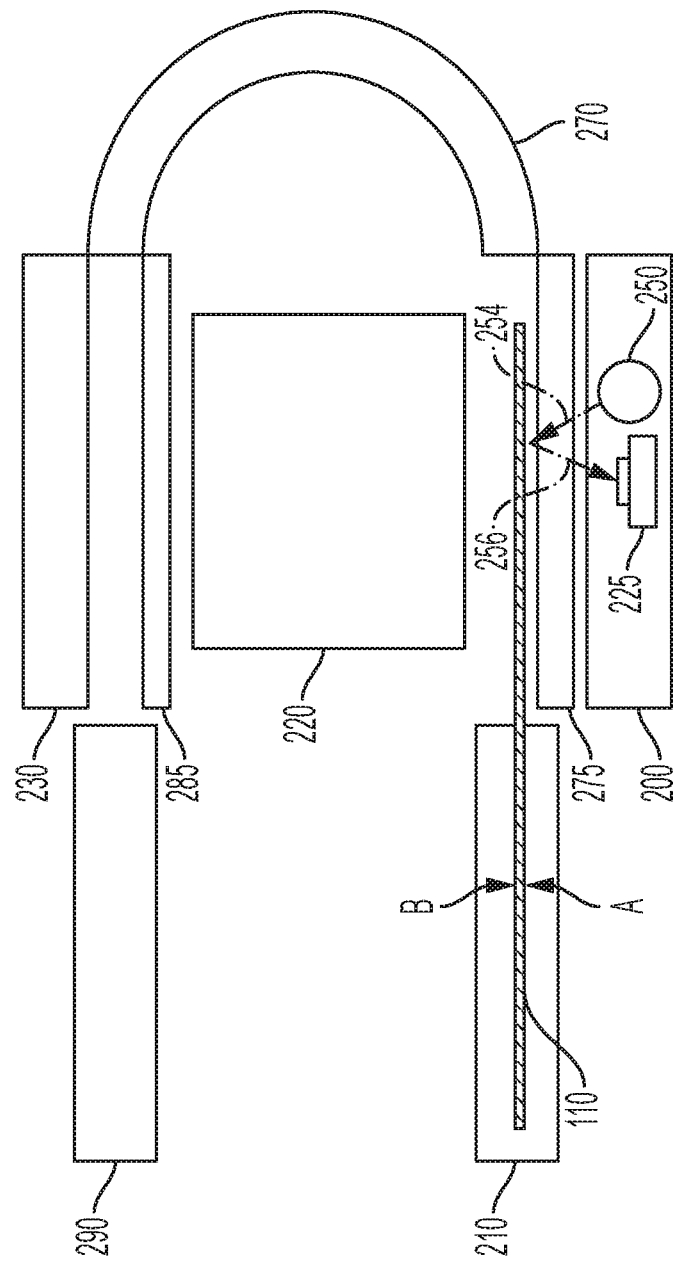

FIG. 2A illustrates an example of a duplex document scanning system. As illustrated in FIG. 2A, the duplex document scanning system includes a digital scanning system 200 having a raster image scanner 225 with an accompanying light source 250. A document 110 is transported from an input tray or input staging area 800 to a first imaging area. The first imaging area includes a first transparent platen 275 for imaging or scanning the document 110. The light source 250 illuminates a first side (A) of the document 110 through the first transparent platen 275.

The first transparent platen 275 may be a full document platen wherein, after the document 110 is placed thereon, the digital scanning system 200 is moved across the first side (A) of the document 110 to generate successive scanlines of image data.

In a different configuration, the first transparent platen 275 may be a partial document platen, wherein the digital scanning system 200 is stationary and the document 110, first side (A) facing the stationary digital scanning system 200, is moved across, at a constant velocity, the stationary digital scanning system 200 to generate successive scanlines of image data.

The successive scanlines of image data result from light 254 from the light source 250 illuminating the first side (A) of the document 110, light 256 being reflected therefrom, down through the first transparent platen 275, to the raster image scanner 225. The raster image scanner 225 may be a charge-coupled device or a full-width array.

The duplex document scanning system 200 further includes a semicircular document path 270 that receives the document 110 exiting the first imaging area. The semicircular document path 270 provides a mechanism for inverting the document 110 before the document 110 enters a second imaging area. The second imaging area includes a second transparent platen 285. In the second scanning area, a second side (B) of the document 110 faces the second transparent platen 285 and the digital scanning system 200. Thereafter, the document 110 is transported from the second imaging area to an output tray or an output staging area 290.

The second transparent platen 285 may be a full document platen wherein, after the document 110 is placed thereon, the digital scanning system 200 is moved across the second side (B) of the document 110 to generate successive scanlines of image data.

In a different configuration, the second transparent platen 285 may be a partial document platen wherein the digital scanning system 200 is stationary and the document 110, second side (B) facing the stationary digital scanning system 200, is moved across, at a constant velocity, the stationary digital scanning system 200 to generate successive scanlines of image data.

It is noted that the duplex document scanning system 200 further includes various rollers, nips, and drive motors (not shown) to enable the proper transporting of the document 110 from the input tray or input staging area 210 to an output tray or output staging area 290.

Between the first and second imaging areas, a fiber optic element 220 is located. The fiber optic element 220 may be a single fiber optic element that is capable of both transmitting light from the light source 250 to the second imaging area and transmitting reflected light from the second imaging area to the raster image scanner 225. In a different variation, the fiber optic element 220 may be two fiber optic elements, one capable of transmitting light from the light source 250 to the second imaging area and the other capable of transmitting reflected light from the second imaging area to the raster image scanner 225.

The duplex document scanning system 200 also includes a background area or cover 230 for providing a background to enable document edge detection by the raster image scanner 225. The background area or cover 230 may also include a calibration target to provide the raster image scanner 225 with a reference for "absolute white." It is noted that this calibration target may be located above the second transparent platen 285 since imaging of the light reflected from the calibration target will pass through both the first and second and lower transparent platens (275 and 285).

It is also noted that the above-described duplex document scanning system 200 requires that a set of duplex originals be placed "face up" in the input tray and fed in 1 to N order. The multi-page document will then be delivered "face down" in the output tray but still in the proper order.

As illustrated in FIG. 2A, the document 110 is transported from an input tray or input staging area 210 to a first imaging area. More specifically, the first side (A) of the document 110 is transported to the first transparent platen 275. The light source 250 illuminates the first side (A) of the document 110, with light 254, through the first transparent platen 275.

In a first configuration, the raster image scanner 225 progressively scans, receives reflected light 256, the first side (A) of the document 110 as the first side (A) of the document 110 passes over, at a constant velocity, the stationary raster image scanner 225. In a second configuration, the raster image scanner 225 progressively scans, receives reflected light 256, the first side (A) of the document 110 as raster image scanner 225 passes across the first side (A) of the stationary document 110.

Figure 2B:
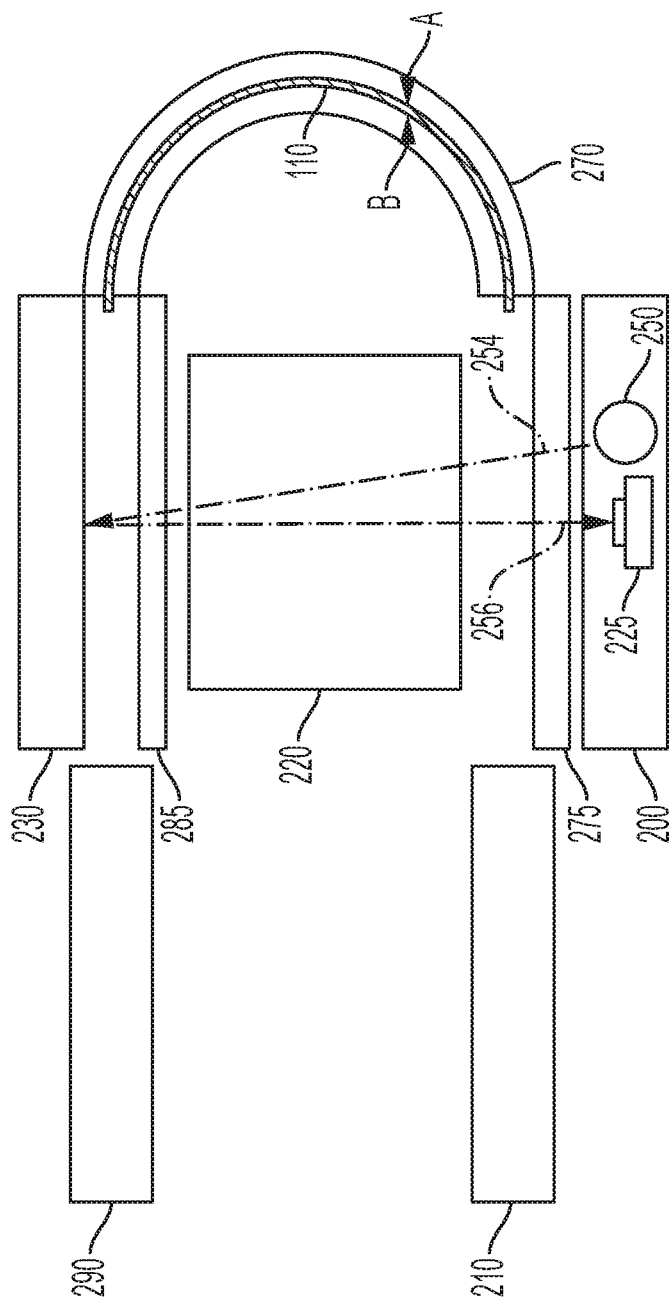

As illustrated in FIG. 2B, as the first side (A) of the document 110 exits the first imaging area, the document 110 enters the semicircular document path 270. The semicircular document path 270 inverts the document 110 with respect to the raster image scanner 225 without stopping the motion of the document 110 or reversal of the forward momentum of the document 110.

As illustrated in FIG. 2C, the document 110 is transported from an exit of the semicircular document path 270 to a second imaging area. More specifically, the second side (B) of the document 110 is transported to the second transparent platen 285. The light source 250 illuminates the second side (B) of the document 110, with light 254, through the first transparent platen 275.

In a first configuration, the raster image scanner 225 progressively scans, receives reflected light 256, the second side (B) of the document 110 as the second side (B) of the document 110 passes over, at a constant velocity, the stationary raster image scanner 225. In a second configuration, the raster image scanner 225 progressively scans, receives reflected light 256, the second side (B) of the document 110 as raster image scanner 225 passes across the second side (B) of the stationary document 110. Thereafter, the document 110 is transported from the second imaging area to an output tray or output staging area 290.

As illustrated in FIG. 2C, the second side (B) of the stationary document 110 is illuminated by light 254 from light source 250 through the first transparent platen 275, the fiber optic element 220, and the second transparent platen 285. The light 256 reflected from the second side (B) of the stationary document 110 is received by the raster image scanner 225, after passing through the second transparent platen 285, the fiber optic element 220 and the first transparent platen 275.

As noted above, the fiber optic element 220 may be a gradient index lens array. The fiber optic element 220 may include a lens, such as a Selfoc Lens and an optical fiber or optical fibers. It is noted that the fiber optic element 220 may be two separate elements, one element for transmitting light to the second imaging area, and the other element for transmitting reflected light from the second imaging area.

It is noted that the gradient index lens array may include a plurality of light-conducting fibers made of glass or synthetic resin which have a refractive index distribution in a cross section thereof that varies parabolically outward from a center portion thereof. Each fiber acts as a focusing lens to transmit part of an image of an object placed near one end of the fiber. The assembly of fibers transmits and focuses sequential line scans of a document.

It is further noted that the duplex document scanning system may have been constructed in an opposite fashion than illustrated by FIGS. 2A-2C. More specifically, the output tray or output staging area 290 may have been positioned below the input tray or input staging area 210. In such construction, the document 110 would move in an opposite direction than described above.

The duplex scanning system 200 as shown is exemplary in nature and is just one way to show how the duplex scanning can be implemented. It is understood that there can be variations to the system 200 or the mechanism as explained in FIGS. 2A, 2B and 2C. The present disclosure is not limited to the example as discussed here.

Exemplary System

Figure 3:
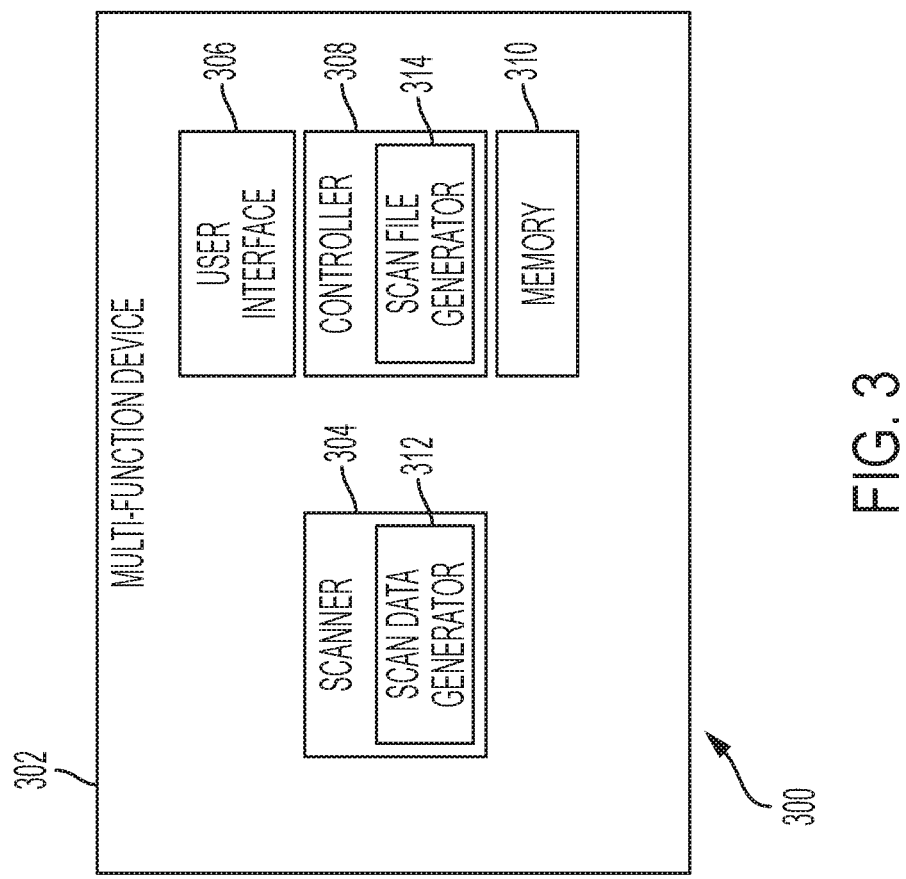
FIG. 3 is an overall system for retaining duplex scanning information in a scanned output file.

FIG. 3 shows an overall block diagram of a system 300 for retaining duplex scanning information in a scanned output file. References to other figures such as FIGS. 1A-1C, 2A-2C and others can be made while discussing FIG. 3. As shown, the system 300 includes a multi-function device 302. The multi-function device 302 includes a scanner 304 (also referred to as scanning module) having a scan data generator 312, a user interface 306, a controller 308 having a scan file generator 314, and a memory 310. The multi-function device 302 further include a printing engine (although not shown) for printing purpose. Each of the components 304, 306, 308, 310, 312 and 314 are coupled to each other via a communication bus or later developed protocols and each of the components 304-314 communicate with each other for retaining duplex scanning information in a scanned output file. The duplex scanning information may be a part of page numbers which are displayed in the page property or may be a part of extension of the scanned output file. The multi-function device 302 may include one or more additional components as required to implement the current disclosure.

A user uses the multi-function device 302 for scanning a document. The document is in physical form and includes one or more pages. For the purpose of discussion, the document includes a page having a front side and a back side. The front side includes content and the back side includes content, wherein content may be in the form of text, image, graphics or a combination thereof. The document may be of any sizes without limiting the scope of the disclosure. The page may or may not have associated page numbers. Any side of the document input for scanning first is considered as a front side and other side is considered as a back side.

The scanner 304 receives the document input by the user for scanning. The scanner 304 may be an Automatic Document Feeder (ADF) or a flatbed scanner. The flatbed scanner includes a glass or a platen for receiving the document. In the flatbed scanner, the user first places front side of the document for scanning and manually flips and places the back side of the document for scanning. The ADF scanner includes an input tray for receiving the document for scanning. The ADF scanner takes the document inside and automatically scans both sides of the document in a single pass. If the user scans the document using the flatbed scanner, then the front side and back side can be set manually by the user. Else if the user scans the document using ADF, then the side of the document input first for scanning is considered as a front side and the other side is considered as a back side. In this manner, both sides of the document are considered for scanning by the flatbed scanner or ADF scanner. These are just two examples, but other types of scanner may be used for implementing the present disclosure. Moreover, the type of scanner does not interfere while implementing the present disclosure.

After inputting the document, the user initiates a scan operation by pressing a scan button, the controller 308 provides or displays a user interface. The controller 308 displays the user interface 306 before initiating the scan. The user interface 306 allows the user to provide input in the form of scan settings such as color, contrast, paper, type, etc. The user interface 306 further allows the user to view output in the form of notifications, messages, alerts or any other information relevant for the current disclosure. In context of the current disclosure, the user interface 306 allows the user to select a duplex scanning feature by the user. The duplex scanning feature indicates that the user wishes to scan both sides of the document and further indicates that the duplex scanning information is to be retained in the scanned output file. Upon selecting the duplex scanning feature, the multi-function device 302 or the controller 308 automatically retains the duplex scanning information in the scanned output file.

Figures 7A, 7B:
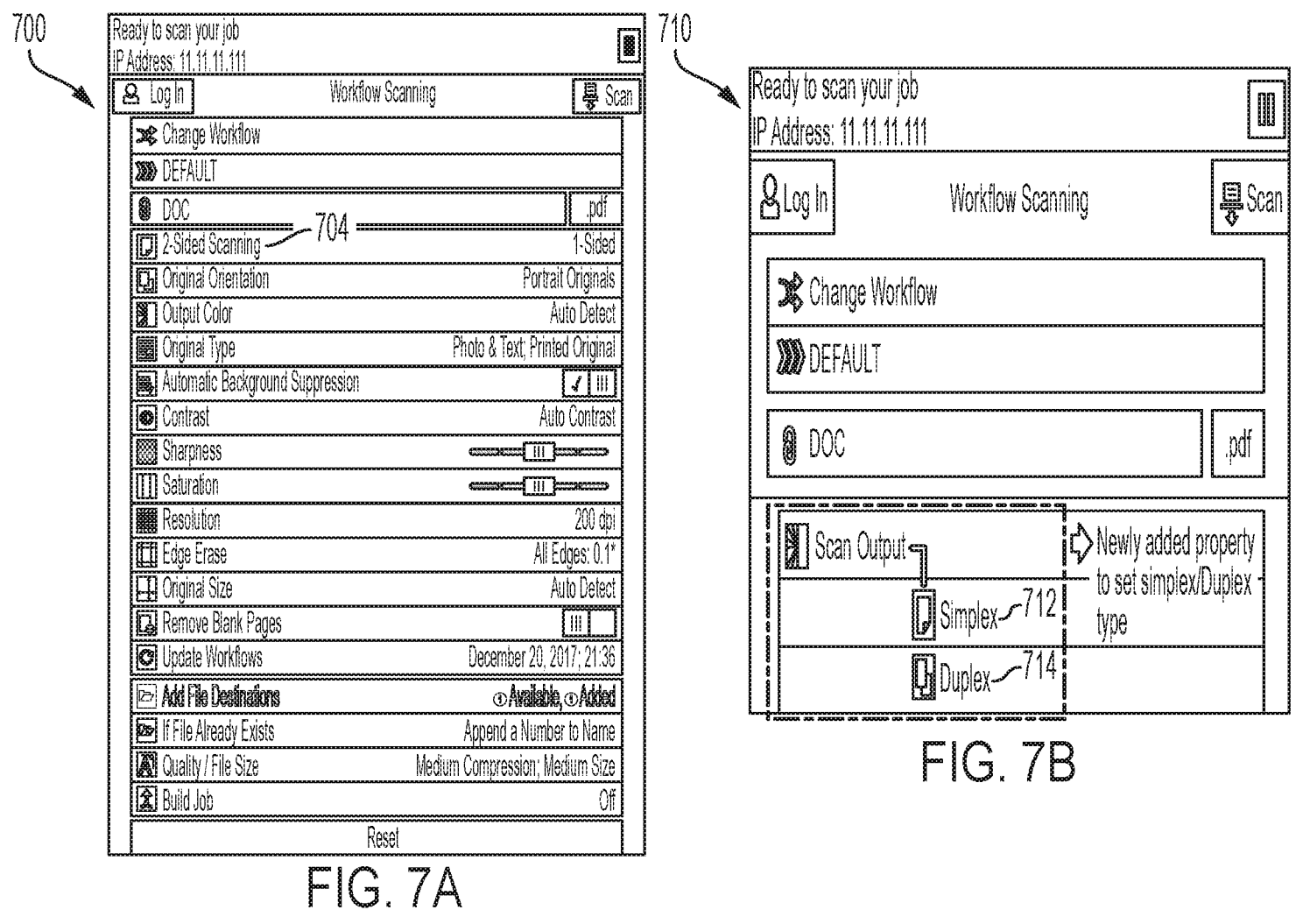

One such exemplary snapshot of a user interface 700 is shown in FIG. 7A. The user interface displays various scan options such as 2-sided scanning 704, original orientation, original, contrast, sharpness, etc. The user selects the option 704 indicating he wishes to proceed with 2-sided scanning, i.e., duplex scanning. Another user interface 710 is shown. The user interface 710 allows the user to select type of scan output such as simplex 712 and duplex 714. The user selects 714 option and the selection of the option 714 indicates the user wishes to retain duplex scanning information in the scanned output file.

Once the user submits the required input via the user interface 306, the controller 308 communicates with the scanner 304 to initiate scanning.

The scanner 304 receives the document having a front side and a back side for each page and initiates scanning process. The scan data generator 312 scans the document and generates image data representing image of the document. The scan data generator 312 analyzes/reads the document, performs Optical Character Recognition (extracts content of the document) and finally generates the image data of the document. The generated image data is passed to the controller 308.

The controller 308 receives the generated image data. The controller 308 passes the image data along with the selected duplex scanning feature to the scan file generator 314 for further processing. The scan file generator 314 receives the image data and the duplex scanning option from the controller 308. The scan file generator 314 processes the image data and the duplex scanning feature selected by the user to generate the scanned output file. The scan file generator 314 generates a scanned output file. Before generating the scanned output file, the scan file generator 314 implements a process of generating duplex scanning information for the scanned output file. The scan file generator 314 generates the scanned output file having scanned pages, the scanned output file includes the duplex scanning information. The scan file generator 314 retains the duplex scanning information in the scanned output file for later retrieval. The scan file generator 314 passes the scanned output file including the duplex scanning information to the controller 308. The duplex scanning information may be at least one of a new page number for each scanned page and a new file extension. The duplex scanning information helps identify that the scanned output file is duplex scanned file and further helps identify which scanned page represents a front side and which scanned page represents a back side of the document. The functionality of the scan file generator 314 can directly be incorporated in the controller 308 and the controller 308 performs all the functionalities just discussed.

The duplex scanning information may be generated based on the user input or may be generated automatically when duplex scanning is performed.

In case the scan file generator 314 decides to generate the duplex scanning information in the form of a new page number for each scanned, the scanned output file is created in a pre-defined format such as PDF. While creating the scanned output file, the scan file generator 314 automatically creates the new page number for each scanned page and further assigns the new page number to each scanned page in the scanned output file. The new page numbers are embedded in the scanned output file. The new page numbers are designated with front side and back side information. The new page numbers are automatically displayed in the page property of the scanned output file, when the user opens the scanned output file using his computing device such as a laptop, a personal computer, a mobile device or at the multi-function device 302, and so on.

In case the scan file generator 314 decides to generate the duplex scanning information in the form of a new file extension, the scan file generator 314 assigns the new file extension to the scanned output file. The scanned output file is created with the new extension such as "*.b2b." The scanned output file is stored with the new file extension in the memory 310 and the new extension is recognized by all multi-function devices. The scanned output file with the new extension is readable by all devices such as multi-function devices or computing devices. The new file extension generated the multi-function device 302 can be viewed in the same fashion as the PDF file but the new file extension is different from the existing file extensions.

The controller 308 receives the scanned output file with the duplex scanning information and stores the scanned output file with the duplex scanning information in the memory 310 for later retrieval and/or access. The stored scanned output file can be accessed by the user for viewing at the multi-function device 302. When viewing by the user, the multi-function device 302 automatically displays the duplex scanning information in the form of property, for example, page numbers in the page property. The new file extension in the extension property. The stored scanned output file can be accessed by the user for printing at the multi-function device 302. While printing, the multi-function device 302 considers the duplex scanning information and prints the scanned pages on a single sheet instead of two different sheets.

The controller 308 sends the scanned output file with the duplex scanning information to a destination such as email, server, as input by the user. The user may access the scanned output file having the duplex scanning information using his computing device which is communicatively coupled to the multi-function device 302. The controller 308 may send the scanned output file with the duplex scanning information to another multi-function device communicatively coupled to the multi-function device 302.

In cases where the scanned output file with the duplex scanning information requires to be printed may be, by the multi-function device 302 or by another multi-function device communicatively coupled to the multi-function device 302. The another multi-function device identifies the duplex scanning information in the scanned output file, modifies the existing print settings to double side printing automatically. Before printing, a pop-message is displayed to a user for the confirmation. For example, the pop-up message may be "Current file has double side printing properties and confirm the same to proceed." If the user confirms the same, the multi-function device 302 prints the scanned pages on a single sheet. In this manner, the duplex scanning information may be used for printing purpose and original of the document may be recreated.

In certain cases, the scanned output file with the duplex scanning information is stored and accessed by the user using his computing device. When a user opens the scanned output file using his computing device, the computing device automatically displays the new page number for each scanned page in the page property of the scanned output file. When the user opens the scanned output file, the duplex scanning information is read and recognized by existing PDF file systems or other file systems. The new page numbers are displayed in the page property.

The multi-function device 302 is pre-programmed and configured to generate a new file extension such as "*.b2b." The new file extension is recognized by the multi-function device 302 and/or equivalent multi-function devices. When the duplex scanning information is to be retained, the multi-function device 302 assigns the new file extension to the scanned output file.

The system 300 can be implemented in the form of a multi-function device and a server. The system 300 includes a multi-function device 302 and a server (although not shown). In such cases, some functionalities can be performed by the multi-function device 302 and some functionalities can be performed by the server. For example, the multi-function device scans the document and allows the user to select a duplex scanning feature. The server processes the image data, generates the duplex scanning information and retains the duplex scanning information in the scanned output file, for later retrieval and use. This is just an example, the server can be programmed or configured to perform all the functionalities of the controller 308 as discussed above. Further, the sever can be configured in any possible manner to implement the present disclosure in order to generate the duplex scanning information and retain the duplex scanning information, for later access.

It is understood that the scanned output file can be viewed and/or printed at the multi-function device 302. The scanned output file can be viewed and/or printed at a different device such as a computing device or another multi-function device without limiting the scope.

The components 304, 306, 308, 310, 312 and 314 as shown above are for understanding purpose, but the functionalities of these components 304, 306, 308, 310, 312 and 314 can be incorporated in a single component for implementation purpose. Other variations can also be implemented.

Exemplary Flowcharts

Figure 4:
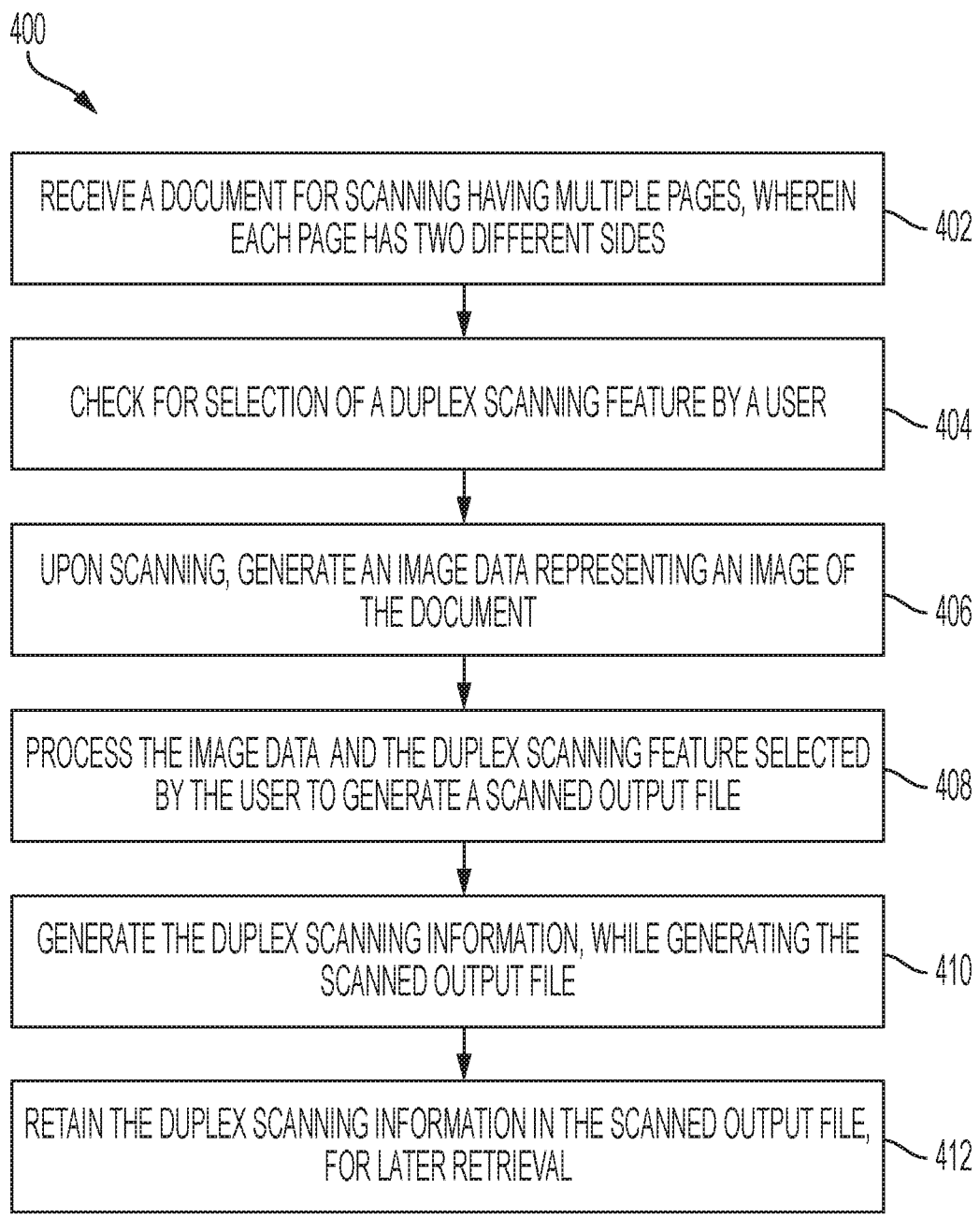
FIG. 4 is a method flowchart for retaining duplex scanning information in a scanned output file.

FIG. 4 is a method flowchart 400 for retaining duplex scanning information in a scanned output file. Specifically, FIG. 4 is a method flowchart 400 for generating and retaining the duplex scanning information (double-sided scan information) in the scanned output file. The method is implemented by a single multi-function device or an equivalent device. The method may be implemented by a combination of two devices such as a scanner and a printer. The method is implemented for scenarios, where a user wishes to scan both sides of a document, i.e., a front side and a back side. For easy understanding it is considered that the document has a single page having a front side and a back side. But the document can have multiple pages, wherein each page has a front side and a back side.

The method begins at 402, with receiving the document for scanning having multiple pages, each page has two different sides such as a front side and a back side. The document can be of any sizes as known or later developed. Then, at 404 it is checked whether a duplex scanning feature is selected by the user. The selection of duplex scanning feature indicates that the user wishes to scan both sides of the document and retain duplex scanning information in a scanned output file. Upon receiving the document and the duplex scanning feature as selected by the user, a scan operation is initiated. The scanning operation includes two stages; (i) scan data generation, and (ii) scan file generation. At the scan data generation stage, the document is read and an image data representing an image of the document is generated, at 406. At 408, the image data and the duplex scanning feature selected by the user is processed to generate a scanned output file.

At 410, the duplex scanning information is generated while generating the scanned output file. For example, new page numbers may be generated. In another example, a new file extension may be generated. At 412, the duplex scanning information is retained in the scanned output file, for later retrieval and use. The scanned output file includes scanned pages, i.e., a scanned page corresponding to the front side and a scanned page corresponding to the back side. The duplex scanning information is retained in the form of a property and includes at least one of a new page number for each scanned page and a new file extension for the scanned output file. The duplex scanning information helps identify that the scanned output file is duplex scanned and further helps identify two different sides of the document in the scanned output file. In this manner, the human effort to identify the scanned output file is duplex scanned and/or to identify different sides, is reduced.

Once generated, the scanned output file with the duplex scanning information is stored. The scanned output file may be stored at the multi-function device, a server, a database, a personal storage device and so on. The scanned output file with the duplex scanning information may be sent to a pre-defined destination as specified by the user such as a pre-defined folder, a server, a personal storage device, an email, etc., for storage and/or printing. The scanned output file with the duplex scanning information may directly be sent to another multi-function device for storage and/or printing.

In cases where the scanned output file including the duplex scanning information is sent for printing purpose, additional blocks can be implemented as outlined. The scanned output file with the duplex scanning information is transmitted from the multi-function device or otherwise submitted to another multi-function device (although not shown) for printing. For clarity, the another multi-function device is referred as a printer. The scanned output file with the duplex scanning information is received by the printer for printing. The scanned output file is analyzed by the printer to identify the duplex scanning information embedded in the scanned output file. If the scanned output file includes the duplex scanning information, the method proceeds further. The printer recognizes the scanned output file is duplex scanned and requires duplex printing to maintain original format of the document. After analyzing, the printer checks for print settings and automatically enables duplex print setting, before printing. Before printing, a notification is displayed to a user to confirm whether he wishes to proceed with duplex printing. If the user confirms, the scanned pages are printed on both sides of a single sheet i.e., front page on one side of the sheet and back page on another side of the sheet. In this manner, the original format of the document is maintained.

In cases where the scanned output file including the duplex scanning information is stored at the multi-function device or other devices or is sent for storage purpose, additional blocks can be implemented as outlined. If the scanned output file is stored at the multi-function device, the user accesses the scanned output file at the multi-function device. If the scanned output file is stored in a personal storage device, the user can access the scanned output file through the multi-function device or via a computing device. There are just two examples, there can be any variations. The stored scanned output file is accessed by the user for viewing purpose. When the stored scanned output file is accessed, for example via a computing device, the duplex scanning information is automatically displayed when the user opens and/or views the scanned output file. Based on the duplex scanning information, the computing device recognizes and reads the new page numbers and/or the new file extension and accordingly displays the duplex scanning information. For example, when a user opens the scanned output file, page numbers with front and back designation are automatically displayed to the user. This helps the user identify and distinguish which scanned page represents the front side and which scanned page represents the back side. The new page numbers are displayed in the corresponding page property. In another example, when a user opens the scanned output file, a new file extension may be displayed to the user. From the new file extension, the user understands that the scanned output file is duplex scanned and scanned pages are arranged accordingly, where the first scanned page represents a front side and the second scanned page represents a back side.

In case the duplex scanning information is in the form of new page numbers, the method includes creating the new page number for each scanned page and assigning the new page number to each scanned page. The new page number is assigned with side designation such as front side or back side. When the user accesses the scanned output file having the new page number, for example, using his computing device, the new page number for each scanned page is automatically displayed in the page property, when the user opens the scanned output file. The new page numbers may be created based on top and bottom scanning positions.

In cases where the duplex scanning information is a new file extension, the method includes assigning a new file extension to the scanned output file.

It may be noted that a user who accesses the scanned output file having the duplex scanning information for viewing and/or printing at later stages can be the same user who submitted the document for scanning or it can be a different user. For example, a user who submits the document for scanning can be a customer and later the corresponding scanned output file is accessed by another user such as a bank staff. In another example, a user who submits the document for scanning can be a bank staff and later the corresponding scanned output file is accessed by another bank staff member. In a further example, a user who submits the document for scanning can be a bank staff and later the corresponding scanned output file is accessed by the same bank staff member. The aspect of the same user or different user does not interfere while implementing the present disclosure. Similarly, a multi-function device for accessing (viewing and/or printing) the scanned output file having the duplex scanning information at later stages can be the same multi-function device that is used for scanning the document or it can be a different multi-function device. The aspect of the same multi-function device or different multi-function device does not interfere while implementing the present disclosure. It is understood that the present disclosure covers all possible variations of the duplex scanning information, the user and the multi-function device.

Figure 5:
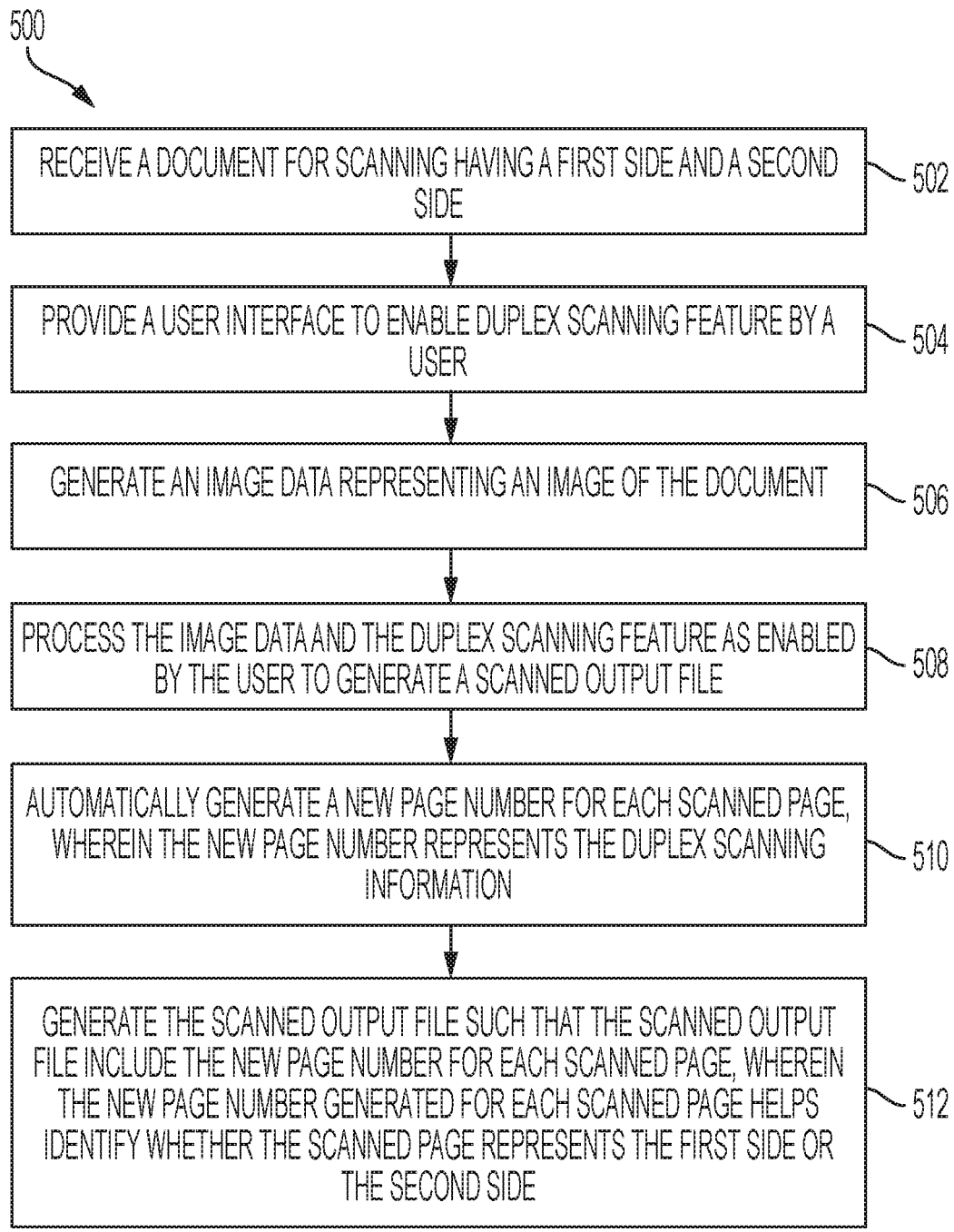
FIG. 5 is a method flowchart for retaining duplex scanning information as new page numbers in a scanned output file.

FIG. 5 is method flowchart 500 for retaining duplex scanning information in a scanned output file. The method flowchart focuses on retaining new pages numbers in the scanned output file.

The method begins when a user submits a document for scanning. At 502, the method includes receiving a document for scanning having multiple pages, wherein each page has two different sides, a first side and a second side. The first side can be the front side and the second side can be the back side. At 504, a user interface is provided to enable a duplex scanning feature by the user. In some cases, the duplex scanning feature is enabled by default in the multi-function device. Then, a scan operation is initiated. At the time of scanning, it is checked whether the duplex scanning feature is selected by the user. Upon scanning, an image data representing an image of the document is generated, at 506. The image data and the duplex scanning feature selected by the user is processed to generate a scanned output file at 508.

At 510, a new page number for each scanned page is automatically generated wherein the new page number represents the duplex scanning information. Finally, at 512, a scanned output file is generated such that the scanned output file includes the new page numbers, wherein the new page number generated for each scanned page helps identify whether the scanned page represents the first side or the second side, i.e., the front side or the back side. The new page number for each scanned page includes information about side of the document such as front side or back side. The scanned output file is generated in a pre-defined format such as PDF format.

The scanned output file with the new page number may be sent to another multi-function device for printing. The another multi-function device receives the scanned output file with the new page numbers, for printing. At the another multi-function device, the scanned output file is analyzed to identify the new page number for each scanned page in the scanned output file. Based on the analysis, duplex printing is automatically enabled, before printing the scanned output file. In this manner, the scanned pages are printed on a single sheet instead of two different sheets.

The scanned output file with the new page numbers may be sent for storage purpose. When the user accesses/opens the scanned output file using any device such as a computing device, the new page number is automatically displayed for each scanned page in the corresponding page property of the scanned output file. From the displayed new page numbers, the user can figure out which scanned page represents the front page and which scanned page represents the back page.

The scanned output file can be stored at the multi-function device and can be accessed later for viewing and/or printing. The scanned output file is processed at the multi-function device in the same manner as discussed just above.

The new page numbers are readable and recognizable by the user and the multi-function device.

Figure 6:
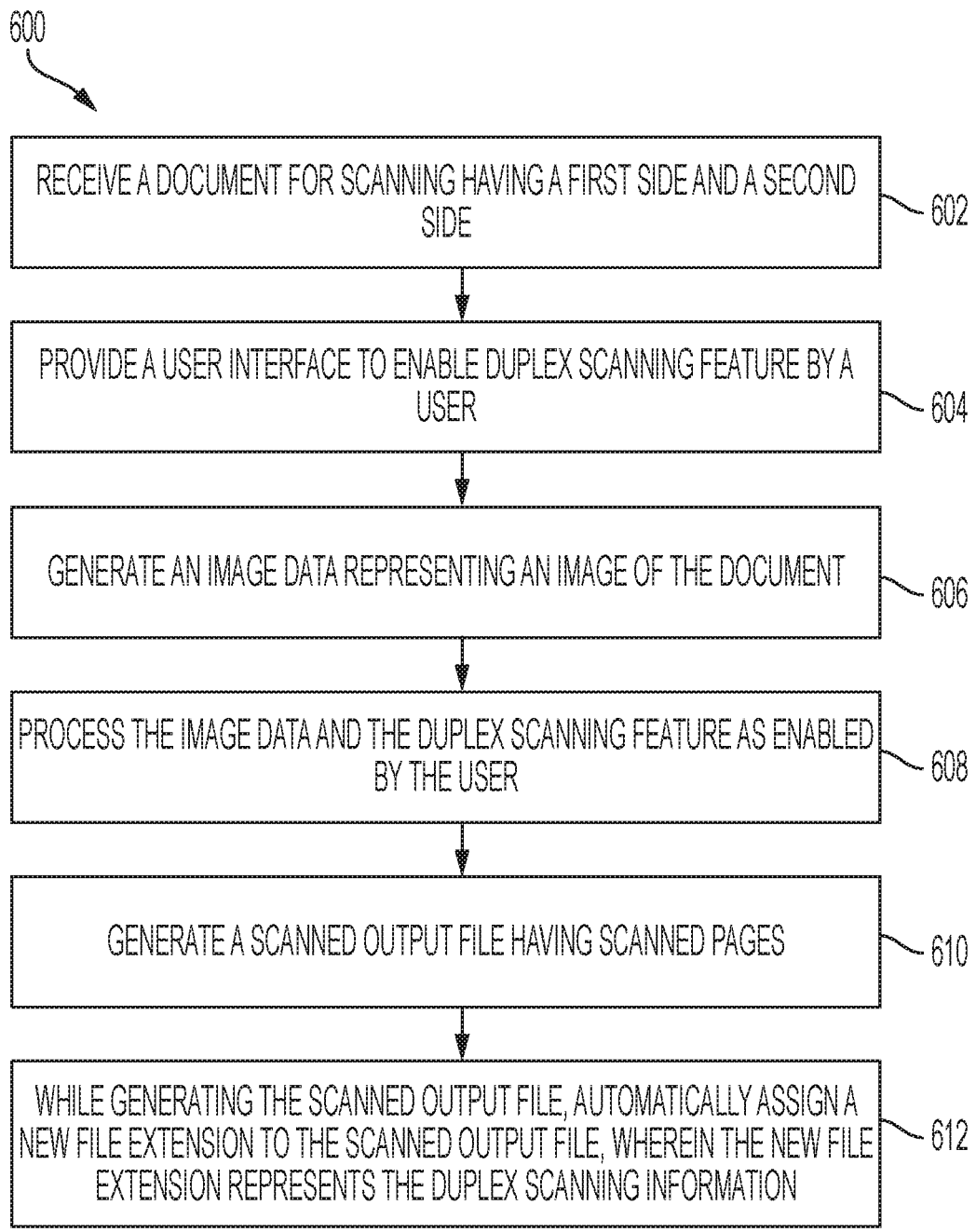
FIG. 6 is a method flowchart for retaining duplex scanning information as a new file extension for a scanned output file.

FIG. 6 is method flowchart 600 for retaining duplex scanning information in a scanned output file. According to the flowchart 600, the duplex scanning information is a new file extension for the scanned output file.

The method includes receiving a document for scanning having a first side and a second side at 602. At 604, a user interface is provided to enable a duplex scanning feature by the user. In some cases, the duplex scanning feature is enabled by default in the multi-function device. Then, a scan operation is initiated. At the time of scanning, it is checked whether the duplex scanning feature is selected by the user. Upon scanning, an image data representing an image of the document is generated at 606. The image data and the duplex scanning feature selected by the user is processed to generate a scanned output file at 608. The scanned output file having scanned pages is generated at 610. While generating the scanned output file, a new file extension is automatically assigned to the scanned output file at 612, wherein the new file extension represents the duplex scanning information. The scanned output file with the new file extension is stored.

The scanned output file with the new file extension may be sent to another multi-function device for printing. The another multi-function device receives the scanned output file with the new file extension, for printing. At the another multi-function, the scanned output file is analyzed to identify the new file extension assigned to the scanned output file. Based on the analysis, duplex printing is automatically enabled, before printing the scanned output file.

The scanned output file with the new file extension may be sent for storage purpose. When the user accesses/opens the scanned output file using any device such as a computing device, the new file extension is automatically displayed for the scanned output file. From the displayed new file extension, the user can figure out the scanned output file is duplex scanned and scanned pages are arranged accordingly.

The methods and systems are explained above with respect to documents having front side and back side. But the methods and systems can be implemented for any documents having pages, where each page has a left side and a right side. One such example is bound book but there can be many other examples. In such cases, the page numbers are designated with left side and right side. For example, the scanned page may have a page number as "1L" and "1R," where 1 represents page 1 and "L" indicates a left side. Similarly, where 1 represents page 1 and "R" indicates a right side.

The format of new page numbers as discussed above is exemplary in nature and the page number can be defined in other formats that help identify front side and back side of the document in the scanned output file. Similarly, the extension "*.b2b" is just one example for understanding purpose, the new file extension may be "*.backtoback" or other formats that help identify the scanned output file is duplex scanned and requires duplex printing at the time of printing.

The duplex scanning information is added to the scanned output file in the form of property. The property may be readable and recognized by a device such as computing device, a multi-function device or an equivalent device. The duplex scanning information helps recognizing that the scanned output file is duplex scanned and requires processing accordingly. Further, the duplex scanning information may not be printed while printing the scanned output file. In case the duplex scanning information corresponds to new pages numbers, the scanned output file is generated in PDF format. The PDF file system recognizes the new page numbers added as property and the new page numbers are displayed when the scanned output file is opened. In case the duplex scanning information corresponds to the new file extension, the scanned output file is generated with the new file extension. The new file extension indicates the document is duplex scanned.

The duplex scanning information retained in the scanned output file is considered by devices such as computing device while displaying the scanned output file. The duplex scanning information retained in the scanned output is considered by devices such as a multi-function device while displaying and/or printing the scanned output file.

The methods 400, 500, 600 can be implemented by a multi-function device such as multi-function device 100 with user input as required.

Exemplary Scenarios

For better understanding, an example is described without limiting scope of the present disclosure. It can be considered that a user requires to submit a document such as a driving license to a bank. The user uses a multi-function device such as 302 for scanning the document and submits the scanned document to the bank. The user selects the duplex scanning feature via a user interface. According to the implementation of the current disclosure, the multi-function device 302 scans the document and generates a scanned output file having duplex scanning information. The scanned output file includes two scanned pages, i.e., one scanned page corresponds to a front side and a second scanned page corresponds to a back side. In an example, it is considered the scanned output file includes a new page number for each scanned page. Accordingly, the first scanned page is assigned page number "1F," and the second scanned page is assigned page as "1B." The modified page numbers are assigned as a part of the property not as actual page numbers to the scanned pages. The scanned output file is sent by the user to another user such as a bank executive at a provided email address. The scanned output file is received by another user. When the bank executive opens the scanned output file using his computing device or any other device, the scanned output file automatically displays the new page numbers in the page property of the PDF scanned output file. Here, page "1F" and "1B" are displayed to the bank executive. Through the new page numbers, the bank executive can easily figure out that the 1F represents front side of the driving license and 1B represents the back side of the driving license as depicted in FIG. 1C.

Further continuing with this example, the bank executive requires printouts of the received scanned output file. The bank executive submits the received scanned output file to a multi-function device for printing. The multi-function device receives the scanned output file, analyzes the scanned output file to read the duplex scanning information and automatically enables duplex printing mode such that the scanned pages representing the front side and back side are printed on a single sheet. While printing, the multi-function device may not consider printing page 1F and 1B in printouts as 1F and 1B are added to the scanned output file as property.

In cases where the document has 2 pages, each page has a front side and a back side. In the scanned output file, scanned pages are assigned page numbers as "1F" (page 1 front side), "1B" (page 1 back side), "2F" (page 2 front side), and "2B" (page 2 back side).

In another example, it is considered the scanned output file includes a new file extension as a property. For example, the scanned output file may be "doc.b2b". Here, "doc" is the name of the document and ".b2b" represents the new file extension. The scanned output file is sent to another multi-function device for printing. The multi-function device receives the scanned output file, analyses the scanned output file, recognizes the new file extension and automatically enables duplex printing such that the scanned pages are printed on both sides of a single sheet.

The present disclosure discloses methods and systems for retaining duplex scanning information in a scanned output file, in the form of property. The methods and systems propose two ways of retaining the duplex scanning property—i) new page numbers for scanned pages and a new file extension for the scanned output file. The new page numbers include information about sides such as front side and back side that helps users to easily identify front and back sides in the scanned output file. The methods and systems automatically detect front and back sides in the scanned output file, based on the duplex scanning information, thus, no user knowledge or effort is required to determine which side is a front side and which side is a back side. Additionally, an advanced option is implemented to prompt the user to make a decision while printing the scanned output file having the duplex scanning information. When the user wishes to print the same scanned output file, the user need not manually set double side printing option while printing and thereby reduces his effort. The methods and systems automatically change print settings to duplex print settings of the scanned output file having the duplex scanning information. This helps printing the two sides of the scanned output file on a single sheet instead on two different sheets, thereby reduces paper wastage. Overall, the methods and systems maintain co-relation between different sides in the scanned output file as well as in the printed version of the scanned output file. In this manner, the duplex scanning information helps maintain properties in a similar way as in original documents received for scanning. By retaining the duplex scanning information in the scanned output file, the present disclosure ensures original source format is known, i.e., whether both sides of the document are scanned.

The present disclosure may be implemented for any scenarios where duplex scanning information is required by a user or by organizations. For example, the present disclosure can be implemented for any scenarios where information about both sides of a document needs to be maintained for later retrieval and use. The disclosure may be useful in certain document workflows and applications (e.g., legal) where original order correspondence is helpful. These are few exemplary scenarios just for illustration, but the disclosure can be implemented for any scenario or by anyone.

For a person skilled in the art, it is understood that the use of phrase(s) "is," "are," "may," "can," "could," "will," "should," or the like is for understanding various embodiments of the present disclosure and the phrases do not limit the disclosure or its implementation in any manner.

It is emphasized that the term "comprises" or "comprising" is used in this specification to specify the presence of stated features, integers, steps or components, but does not preclude the addition of one or more further features, integers, steps or components, or groups thereof.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "scanning," or "analyzing," or "storing," or "generating," or "receiving," "or transmitting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for retaining duplex scanning information in a scanned output file, comprising:
   receiving a document for scanning having multiple pages, wherein each page comprises a first side and a second side;
   checking for selection of a duplex scanning feature by a user;
   upon scanning, generating an image data representing an image of the document;
   processing the image data and the duplex scanning feature selected by the user to generate a scanned output file having a file name;
   assigning, for each side of each scanned page in the scanned output file, a virtual page number, the virtual page number indicating a sequential order and a side designation, the side designation indicating whether a side of each scanned page is the first side or the second side;
   generating the duplex scanning information, while generating the scanned output file, wherein generating the duplex scanning information comprises assigning a duplex file extension to the scanned output file, the duplex file extension:
      indicating that the scanned output file is duplex scanned,
      indicating that the scanned output file is to be duplex printed, wherein duplex printing is printing on both sides of one or more sheets,
      being independent of the file name of the output file, and
      being recognizable by a multi-functional device to automatically change print settings to duplex printing when printing the document;
   retaining the duplex scanning information in the scanned output file, for later retrieval and use;
   determining from the duplex file extension that the scanned output file is to be duplex printed; and
   automatically enabling, based on determining, a duplex printing setting, before printing the scanned output file.

2. The method of claim 1, wherein the duplex scanning information is retained in the scanned output file in the form of a property.

3. The method of claim 1, wherein the duplex scanning information comprises the virtual page number for each side in the scanned output file.

4. The method of claim 1, further comprising storing the scanned output file having the duplex scanning information and having the duplex file extension.

5. The method of claim 1, further comprising automatically displaying the virtual page number for each side in a page property, when the user opens the scanned output file.

6. The method of claim 1, further comprising receiving the scanned output file with the duplex scanning information, by a multi-function device, for printing.

7. The method of claim 1, wherein the first side is a front side of the sheet and the second side is a back side of the sheet.

8. A method for retaining duplex scanning information in a scanned output file, the method comprising:
   receiving a document for scanning having multiple pages, wherein each page comprises a first side and a second side;
   providing a user interface to enable duplex scanning feature by a user;
   generating an image data representing an image of the document;
   processing the image data and the duplex scanning feature as enabled by the user to generate a scanned output file having a file name;
   automatically generating a virtual page number for each side of each scanned page, wherein the virtual page number represents the duplex scanning information;
   generating the scanned output file such that the scanned output file comprises the virtual page number for each scanned page, wherein the virtual page number generated for each scanned page identifies a sequential order of the scanned page and whether a side of each scanned page is the first side or the second side, and generating the scanned output file comprises assigning a duplex file extension to the scanned output file, the duplex file extension:
      indicating that the scanned output file is duplex scanned,
      indicating that the scanned output file is to be duplex printed, wherein duplex printing is printing on both sides of one or more sheets,
      being independent of the file name of the output file, and being recognizable by a multi-functional device to automatically change print settings to duplex printing when printing the document;
determining from the duplex file extension that the scanned output file is to be duplex printed; and
automatically enabling, based on determining, a duplex printing setting, before printing the scanned output file.

9. The method of claim 8, further comprising automatically displaying the virtual page number for each side in a corresponding page property of the scanned output file, when the user opens the scanned output file.

10. The method of claim 8, further comprising receiving the scanned output file with the virtual page number for each side, for printing.

11. The method of claim 10, further comprising analyzing the scanned output file to identify the virtual page number for each side in the scanned output file.

12. The method of claim 8, wherein the first side is a front side of the sheet and the second side is a back side of the sheet.

13. A method for retaining duplex scanning information in a scanned output file, the method comprising:
receiving a document for scanning having multiple pages, wherein each page comprises a first side and a second side;
providing a user interface to enable a duplex scanning feature by a user;
generating an image data representing an image of the document;
processing the image data and the duplex scanning feature as enabled by the user;
generating a scanned output file having scanned pages and a file name;
while generating the scanned output file, automatically assigning:
for each side of each scanned page in the scanned output file, a virtual page number, the virtual page number indicating a sequential order and a side designation, the side designation indicating whether a side of each scanned page is the first side or the second side, and
a duplex file extension to the scanned output file, wherein the duplex file extension:
represents the duplex scanning information,
indicates that the scanned output file is duplex scanned,
indicates that the scanned output file is to be duplex printed, wherein duplex printing is printing on both sides of one or more sheets,
is independent of the file name of the output file, and
is recognizable by a multi-functional device to automatically change print settings to duplex printing when printing the document;
determining from the duplex file extension that the scanned output file is to be duplex printed; and
automatically enabling, based on determining, a duplex printing setting, before printing the scanned output file.

14. The method of claim 13, further comprising storing the scanned output file with the duplex file extension.

15. The method of claim 13, wherein the first side is a front side of the sheet and the second side is a back side of the sheet.

16. A multi-function device, comprising:
a user interface to allow a user to select a duplex scanning feature; and
a scanner having a scan data generator to:
receive a document for scanning having multiple pages, wherein each page comprises a first side a second side, and
generate an image data representing an image of the document; and
a controller having a scan file generator to:
process the image data and the duplex scanning feature selected by the user, to generate a scanned output file having a file name;
assign a virtual page number to each side of each scanned page indicating a sequential order and a side designation for each scanned page in the scanned output file, the side designation indicating whether a side of the each scanned page is the first side or the second side;
generate duplex scanning information, while generating the scanned output file, wherein to generate the duplex scanning information, the controller is to assign a duplex file extension to the scanned output file, the duplex file extension:
indicating that the scanned output file is duplex scanned,
indicating that the scanned output file is to be duplex printed, wherein duplex printing is printing on both sides of one or more sheets,
being independent of the file name of the output file, and
being recognizable by a multi-functional device to automatically change print settings to duplex printing when printing the document;
retain the duplex scanning information in the scanned output file, for later retrieval;
determine from the duplex file extension that the scanned output file is to be duplex printed; and
automatically enable, based on determining, a duplex printing setting, before printing the scanned output file.

17. The multi-function device of claim 16, wherein the duplex scanning information is retained in the scanned output file in the form of a property.

18. The multi-function device of claim 16, wherein the duplex scanning information comprises the virtual page number for each side in the scanned output file.

19. The multi-function device of claim 16, wherein the multi-function device is communicatively coupled to a computing device, and wherein the computing device is to automatically display the virtual page number for each side in a page property of the scanned output file, when the user opens the scanned output file.

20. The multi-function device of claim 16, wherein the multi-function device is communicatively coupled to another multi-function device.

21. The multi-function device of claim 20, wherein the other multi-function device determines from the duplex file extension that the scanned output file is to be duplex printed, and automatically enables, based on the determination, the duplex print setting when the scanned output file with the duplex scanning information, is received for printing.

22. The multi-function device of claim 16, wherein the first side is a front side of the sheet and the second side is a back side of the sheet.

23. A system comprising:
a multi-function device for:
receiving a document for scanning having multiple pages, wherein each page comprises a first side and a second side, checking for selection of a duplex scanning feature by a user, upon scanning, generating an image data representing an image of the document, determining from a duplex file extension that a scanned output file is to be duplex printed, and automatically enabling, based on determining, a duplex printing setting, before printing the scanned output file; and a server for:

processing the image data and the duplex scanning feature selected by the user to generate the scanned output file having a file name, assigning, for each side of each scanned page in the scanned output file, a virtual page number, the virtual page number indicating a sequential order and a side designation, the side designation indicating whether a side of each scanned page is the first side or the second side, generating duplex scanning information, while generating the scanned output file, wherein generating the duplex scanning information comprises assigning the duplex file extension to the scanned output file, the duplex file extension:

indicating that the scanned output file is duplex scanned, indicating that the scanned output file is to be duplex printed, wherein duplex printing is printing on both sides of one or more sheets, being independent of the file name of the output file, and being recognizable by a multi-functional device to automatically change print settings to duplex printing when printing the document, and retaining the duplex scanning information in the scanned output file, for later retrieval.

24. The system of claim 23, wherein the first side is a front side of the sheet and the second side is a back side of the sheet.

25. A non-transitory computer-readable medium comprising instructions executable by a processing resource to:

receive a document for scanning having multiple pages, wherein each page comprises a first side a second side;

check for selection of a duplex scanning feature by a user;

upon scanning, generate an image data representing an image of the document;

process the image data and the duplex scanning feature selected by the user to generate a scanned output file having a file name;

assign, for each side of each scanned page in the scanned output file, a virtual page number, the virtual page number indicating a sequential order and a side designation, the side designation indicating whether a side of each scanned page is the first side or the second side;

generate duplex scanning information, while generating the scanned output file, wherein generating the duplex scanning information comprises assigning a duplex file extension to the scanned output file, the duplex file extension:

indicating that the scanned output file is duplex scanned indicating that the scanned output file is to be duplex printed, wherein duplex printing is printing on both sides of one or more sheets, being independent of the file name of the output file, and being recognizable by a multi-functional device to automatically change print settings to duplex printing when printing the document;

retain the duplex scanning information in the scanned output file, for later retrieval; and determine from the duplex file extension that the scanned output file is to be duplex printed; and automatically enable, based on determining, a duplex printing setting, before printing the scanned output file.

26. The non-transitory computer-readable medium of claim 25, wherein the first side is a front side of the sheet and the second side is a back side of the sheet.

* * * * *